May 16, 1939.   R. L'WOLFE   2,158,191
DEVICE FOR SHARPENING LAWN MOWERS
Filed May 29, 1937

INVENTOR
ROBERT L'WOLFE
BY G. Ward Kemp
ATTORNEY

Patented May 16, 1939

2,158,191

UNITED STATES PATENT OFFICE 2,158,191

DEVICE FOR SHARPENING LAWN MOWERS

Robert L'Wolfe, Seattle, Wash.

Application May 29, 1937, Serial No. 145,482

1 Claim. (Cl. 76—82.1)

This invention relates to devices for sharpening lawn mowers, and particularly to devices for holding and guiding sections of files to be operated along the blades of mowers for sharpening the same, and to produce desired shear edges.

Various devices have been tried for holding files or parts thereof, for sharpening mower blades, but the same have not been satisfactory for various reasons. Such other devices have usually included some form of clamps to be operated by set screws or thumb screws. Owing to smallness of the devices such screws must necessarily be limited to small screws and fine threads thereon, and these are insufficient to provide the necessary leverage or power for rigidly holding the file in desired positions for use. Such threads also are soon worn, or drawn out of proper shape when power is applied for holding such files.

Such other devices ordinarily are arranged to sharpen blades with one way curvatures, and some cannot be adjusted for varying curves, and when such adjustments are possible, they are complicated, and require considerable time and care therefor. In most of such devices only a small area of the file teeth are available for use in sharpening, and all of such devices consist of a large number of parts, which are complicated and expensive. Many of such devices also sustain the file in such position on the blades, that the lines of teeth thereon are substantially parallel with the blades, which thereby frequently injure the same by cutting down or removing the shear edges, required for mowing.

It is therefore an object of this invention to provide a simple device, with few parts, that can be easily and cheaply constructed, and which will hold sections of files rigidly in position for sharpening mower blades in varying positions and with varying curves without changes. And which also may be easily and quickly adjusted when necessary for sharpening such blades with varying angles and shear cutting edges, and also to assure that the file teeth will be applied crosswise over the blades, to prevent injury to the edges thereof, and to assure that a large portion of the file faces may be used for sharpening such blades.

A further object is to provide such a simple device whereby a section of file may be adapted for use, and securely clamped therein by a wedge, jaws, and guide bar, cooperating together, for tightening, and loosening, the same, and for adjusting the said few parts of said device, for effective use thereof. All such adjustments to be easily made by the use of any simple tool for loosening or tightening the wedge.

With these and other objects, that will hereinafter appear, I have illustratively exemplified my invention by the accompanying drawing, of which:

Figure 1 represents a top plan of the device, and the edge of a blade, and cross rod of any mower, Figure 2 shows a side elevation of the device, with the wedge in full lines when tightened, and in dotted lines when slackened, Figure 3 represents a bottom plan showing a mower blade curved in one manner, in section, and another blade curved in an alternate manner in dotted lines, both in position for sharpening by the device without adjustment thereof.

Figure 1:
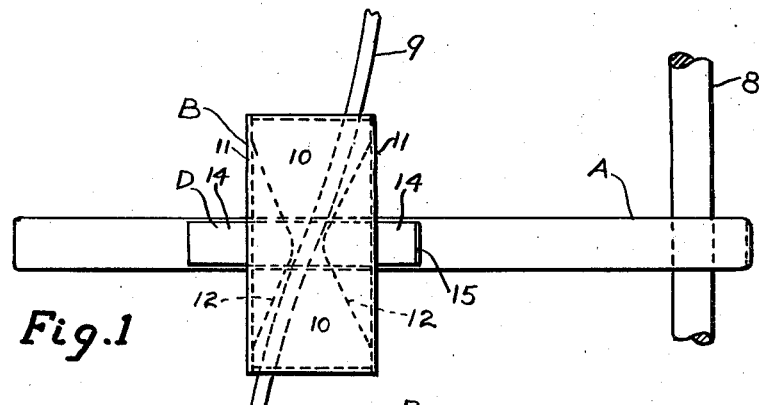
Figure 2:
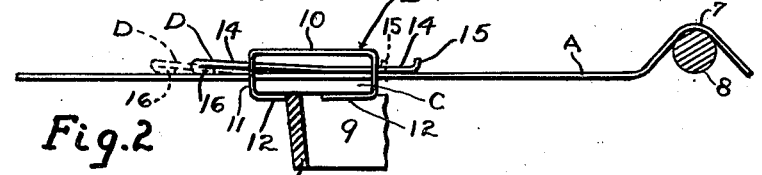

A represents a frame or guide bar, preferably formed of strap metal. Near one end thereof is bent a yoke 7, for slidable contact over the ordinary cross rod 8, of any lawn mower. B indicates generally, a gripping element or clamp for holding a section of a flat file C, in desired position over and across the guide bar, for operation thereof over and along the cutting edge of any lawn mower blade as 9, for sharpening the same. Said clamp member is preferably formed of an integral body of sheet metal, bent into rectangular shape, with a flat cap plate 10, side walls 11, 11, and triangular clamp jaws 12, 12, turned down toward each other, parallel with, and in spaced relation, from the cap plate.

The side walls are each provided with rectangular slots 13, positioned centrally therethrough and extending from near said cap to the outer edge of said jaws, and of suitable width for slidable disposition therethrough of said guide bar.

Figure 3:
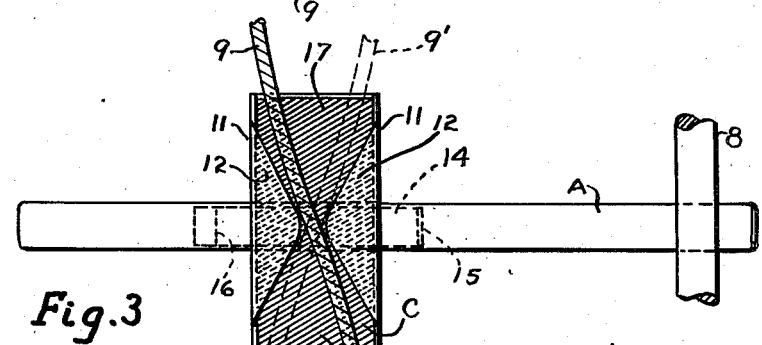
Figure 5:
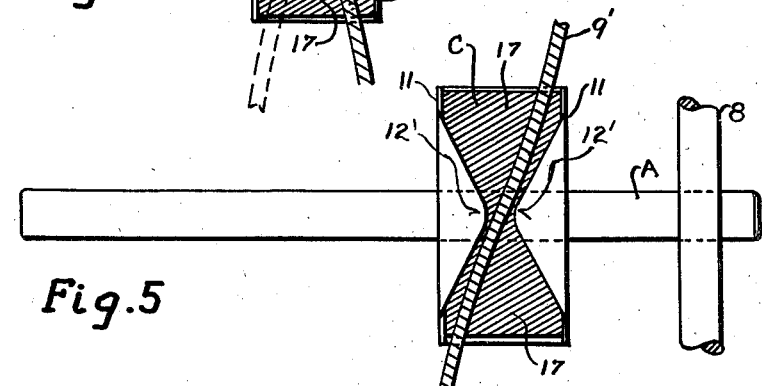
Figure 5 is a bottom plan, showing the alternate form of blade in section, and the clamp moved in closer relation to the rod along the bar.
Figure 4:
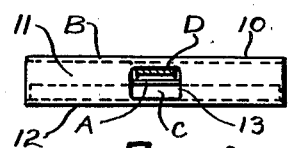
Figure 4 represents an end view, slightly reduced in thickness, and the wedge in section.

A wedge member D is also slidably disposed through such slots and parallel with said guide bar, for adjustably binding said file beneath such jaws, in any desired position along said guide bar. Such wedge member is preferably formed from a strip of flat resilient metal body 14, with the ends thereof extending outward through such slots beyond each side wall. One extremity of such member is turned outward or away from said adjacent guide bar for a knob 15, to prevent the loss of such member, when loosened. The other extremity of such wedge is turned in the opposite direction, to provide an impinging wedge head 16, for binding said file against said clamp jaws, by compression as by tightening said bar, file and wedge, between said cap and jaws, each coacting with the other therefor. The apices 12' of such jaws are spaced apart a suitable width to freely span the thickness of all ordinary mower blades. The triangular shape of such jaws permits the adaptation of such file to blades, with varying curves, as shown in full lines 9, Figure 3, and with alternative curves indicated in full lines in 9', Figure 5, all without readjustment of the clamp.

In use a section of a flat file is assembled and affixed within the clamp in wedged relation on the guide bar at a predetermined position along the same, to fit over the mower blade at suitable distance from the yoke. Such yoke is then guided over such mower cross rod, backward and forward manually, with the file pressed against such blade alternately for suitable action of the file teeth 17 along the blade till it is sharpened.

It will be understood that the desired angle of the shear edge of the blade is determined in part by the distance at which the blade is maintained from the yoke and cross rod. Therefore the clamp must be readily adjusted in different positions along the gide bar. This adjustment is readily accomplished, by loosening of the wedge, by means of a light hammer or any simple tool, for striking or pressing on the knob till the wedge is dislodged from tightened position. The clamp is then moved to any desired point along the bar. The wedge is then tightened by a light blow or pressure on the opposite end, whereby the resilient body of the wedge is moved inward till sufficient tension is obtained, or until the inbent portion 16 is solidly within the wall and slot.

The sloping edges of the jaws, also exposes the greater portion of the file, for use over the blade, and permits the operator to use the file and bar not only at right angles to the rod, but at varying angles, for further determining the distances between the rod and the blade portion being sharpened (as well to fit over blades with opposite or varying curves). Such blades ordinarily are mounted on an axle which freely revolves, to permit the blade to turn as the file and clamp is moved along the same.

Having described my invention, I claim as new:

A device for sharpening lawn mowers including a file receiving clamp of substantially rectangular form having a bottom wall formed to permit guiding cooperation of the clamp with a lawn mower blade, the side walls being formed with opposed openings, a guide bar passed loosely thru said openings and having guiding cooperation with a part of the lawn mower, and a flat resilient wedging member of uniform thickness thruout its length formed with a downturned edge and an upturned edge, said member being passed thru the openings in said clamp member and having a length materially greater than the width of the clamp, the downturned end of the wedging member bearing on the guide bar and acting on movement of the wedging member in one direction to create an increasing wedging function between the guide bar and the upper edge of one of the openings of the clamp, whereby to cause the guide bar to secure a file in the clamp, the turned ends of the wedging member preventing passage of the wedging member thru the openings of the clamp in either direction.

ROBERT L'WOLFE.